United States Patent [19]

Pennington

[11] 4,216,707
[45] Aug. 12, 1980

[54] AIR VENTING SYSTEM FOR AUTOMOTIVE VEHICLES

[76] Inventor: Clifford Pennington, 19371 Ashton, Detroit, Mich. 48219

[21] Appl. No.: 923,580

[22] Filed: Jul. 11, 1978

[51] Int. Cl.² .................. B60H 1/00; E04F 19/08; B60J 9/00
[52] U.S. Cl. .................................. 98/2; 52/303; 296/154
[58] Field of Search ............. 220/DIG. 6, DIG. 19, 220/DIG. 27, 307, 367; 98/2, 2.18, 31; 52/303, 305; 296/154; 49/502

[56] References Cited

U.S. PATENT DOCUMENTS

| 1,340,673 | 5/1920 | Roe | 98/2 |
|---|---|---|---|
| 2,224,296 | 12/1940 | Hoffman | 220/DIG. 19 |
| 2,248,329 | 7/1941 | Bell, Jr. | 98/2.18 |
| 2,513,056 | 6/1950 | Scallon | 98/31 |
| 2,546,672 | 3/1951 | LeClair | 220/DIG. 19 |
| 2,664,809 | 1/1954 | Morell | 52/303 |
| 2,764,929 | 10/1956 | Tegarty | 98/31 |
| 3,382,889 | 5/1968 | Heinz et al. | 296/154 |
| 3,392,654 | 7/1968 | Grenier | 98/2.18 |
| 3,935,686 | 2/1976 | Dozois | 296/154 |
| 4,073,693 | 2/1978 | Janin | 220/367 |

Primary Examiner—Henry C. Yuen
Attorney, Agent, or Firm—Charles W. Chandler

[57] ABSTRACT

A system for preventing rust in an automobile body comprising a system of removable plugs which permit the passage of air through certain body structure to prevent the accumulation of moisture or water.

3 Claims, 7 Drawing Figures

AIR VENTING SYSTEM FOR AUTOMOTIVE VEHICLES

BACKGROUND OF THE INVENTION

This invention is related to rust proofing systems for automobiles, and in particular, a system for encouraging air circulation through body parts which frequently accumulate moisture, water, or mud in inaccessible locations.

Automobile manufacturers construct bodies of thin steel of inexpensive alloy and then strengthen the shell by bracing compartment parts. Water condenses and accumulates in the compartments because they are not ventilated and the interior surfaces are uncoated and unpainted. Surface corrosion follows.

One conventional approach to this problem has been to apply internal preservatives in the body compartments. However, this method still leaves certain areas where traped moisture ultimately forms internal corrosion. For example, many vehicles have a bottom area forward of the front door in which moisture tends to rust out the body. Another vulnerable area is forward of the rear fender.

Another conventional solution has been to provide small bottom openings to permit water to drain, however, such openings are often so designed that water remains trapped in the bottommost part of certain vehicle cavities. Such openings often become plugged with foreign matter.

SUMMARY OF THE INVENTION

The broad purpose of the present invention is to provide removable plugs that encourage the passage of air through certain internal automobile body structures to prevent the accumulation of moisture and water. In the preferred embodiment of the invention, which will subsequently be described in greater detail, a plurality of removable plugs are mounted in appropriately located openings in the body structure. The plugs permit the passage of air for removing moisture from the body structure.

The plugs are removable to permit drainage of water trapped in the body because of blocked drain passages. The removable plugs permit the vehicle owner to easily remove the plugs and flush out the internal body compartments to remove any foreign matter trapping water.

Still further objects and advantages of the invention will be readily apparent to those skilled in the art to which the invention pertains upon reference to the folllowing detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
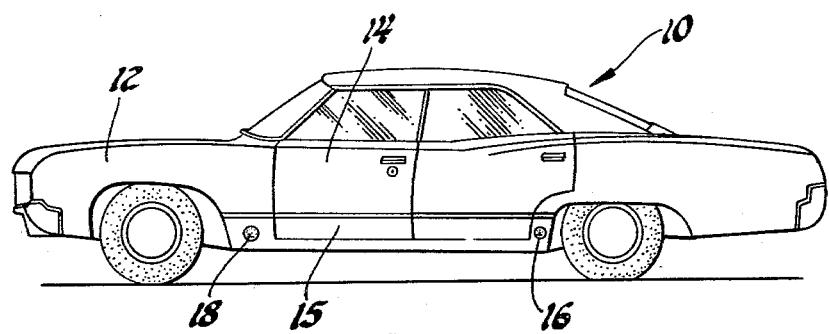
FIG. 1 is a view of an automobile having removable plugs mounted in accordance with the preferred embodiment of the invention.

Referring to the drawing, FIG. 1 illustrates an automotive vehicle 10 having body structure 12. Body structure 12 includes door structure 14 and horizontal molding 15. The body structure is formed of a sheet metal which tends to rust out if not adequately protected.

To protect automobile 10 from rust due to moisture and water, a plug 16 is removably mounted forward of the rear wheel fender, and a plug 18 is removably mounted just forward of the door. Many automobiles rust in these locations because of trapped moisture. The rust action begins on the inside of the sheet metal body structure and progresses outwardly.

Figure 2:
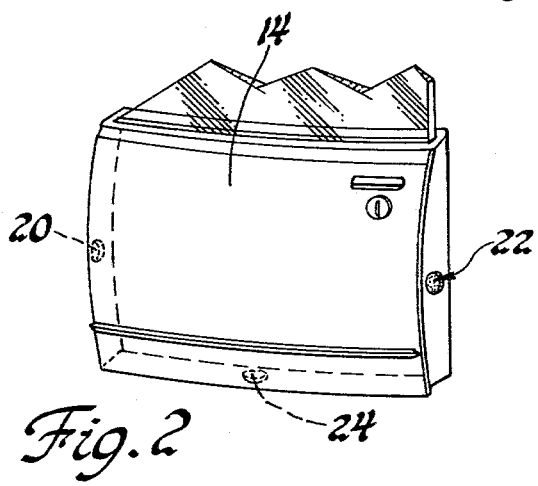
FIG. 2 is a view of a door having the preferred plugs mounted thereon.

Referring to FIG. 2, door 14 has plugs 20 and 22, and a bottom plug 24. Each of the plugs 16, 18, 20, 22, and 24 are removable from their respective locations to permit the user to flush out any foreign deposits that may be internally contained within a body compartment.

Figure 3:
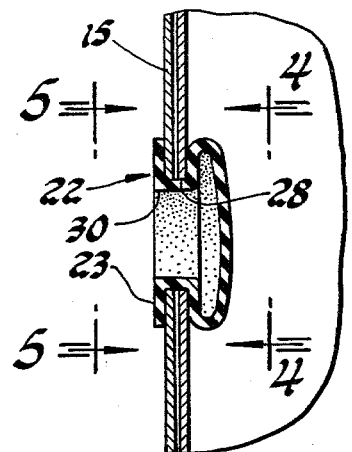
FIG. 3 is an enlarged cross-sectional view through a typical plug mounted in a vertical wall opening.
Figure 4:
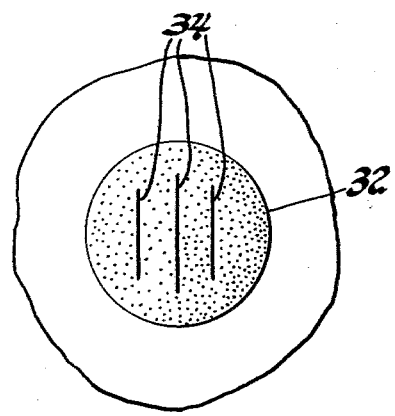
FIG. 4 is a view taken along lines 4—4 of FIG. 3.
Figure 5:
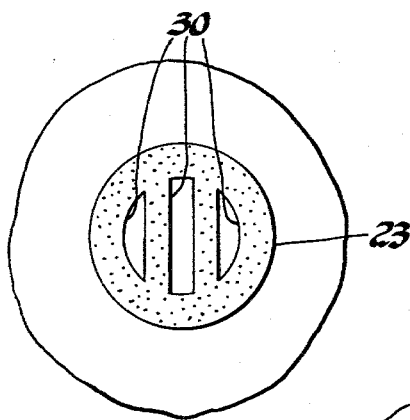
FIG. 5 is a view taken along lines 5—5 of FIG. 3.

Two types of plugs are employed. One is illustrated in FIGS. 3–5 and the other in FIGS. 6–7. Each plug is removable because it can be reduced to a diameter less than the opening in which the plug is mounted.

Plugs 16, 18, 20, and 22 are identical and illustrated in FIGS. 3–5. Referring to FIG. 3, typical plug 22 includes a circular external portion 23 mounted on molding 15 adjacent opening means 28. The diameter of plug portion 23 is greater than the diameter of opening means 28. Portion 23 is formed of a resilient material with a plurality of louvers 30 formed to open in response to air pressure being greater on one side of the louvers than on their opposite side. The louvers close when the pressure on both sides of the wall is balanced.

Plug 22 has an internal portion 32 adjacent opening means 28. Portion 32 is formed such that its diameter is reduced by either pushing into the opening, or removing it from the body. Portion 32 has three slits 34.

The louvers are formed such that when mounted in an external location on the vehicle, the user can rotate the plugs so that the louvers receive air which is then forced through the slits into the internal body portion and create a positive air flow. For example, in FIG. 1, the louvers are directed toward the forward part of the vehicle so that as the vehicle is moving in its forward direction, air is received between the louvers to create a positive air flow.

Similarly, by mounting a pair of plugs on a body structure, such as at 20 and 22, in FIG. 2, the creation of a positive flow of air from one side edge of door 14 toward the opposite side edge tends to remove any accumulation of moist air and thus reduces the tendency of such moisture to condense and form water.

Figure 6:
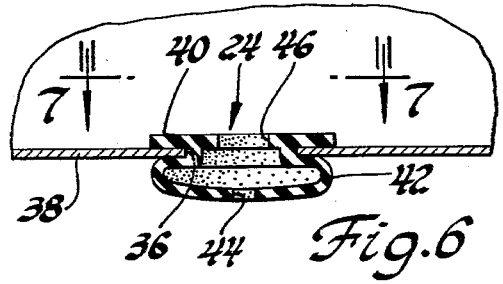
FIG. 6 is an enlarged cross-sectional view through a bottom plug.
Figure 7:
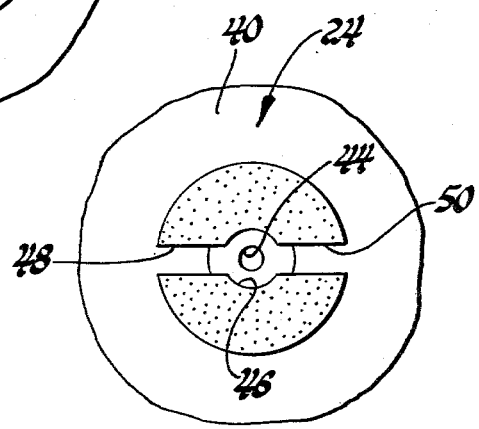
FIG. 7 is a view taken along lines 7—7 of FIG. 6.

Referring to FIGS. 6 and 7, bottom plug 24 is located in the bottom of the door to drain water received into the door structure. Bottom plug 24 is seated in opening 36 in bottom wall 38. Plug 24 includes an internal body portion 40 having a diameter greater than the diameter of opening 36, and engaging wall 38 closely adjacent opening 36. Plug 24 has an external body portion 42 connected to portion 40, adjacent opening 36. Plug 24 is formed of a resilient material that allows the user to remove the plug from the opening. External portion 42 also has a small opening 44 aligned with an opening 46 in internal body portion 40.

Referring to FIG. 7, portion 40 also has a pair of slots 48 and 50. Slots 48 and 50 each extend from the perimeter of body portion 40 inwardly along the diameter of the body to opening 46. They provide means for water to drain along the internal surface of wall 38 and thereby prevent any water from being trapped in the bottom of the door structure.

Plug 24 can be easily removed from the bottom opening and the interior of the door structure flushed out after extremely wet weather to remove any corrosive materials, such as salt and the like, that may have accumulated in the body. Plug 24 also permits air to pass into the door structure and thereby promote air circulation to prevent any moisture from accumulating in the body and contributing to rust.

The louvers in plugs 20 and 22 permit the user to flush water through the plugs without removing the plugs. The plugs are made in different sizes to accomodate the thickness of the structure in which they are mounted. For example, some plugs are mounted in only a sheet metal opening while others are mounted in a position where the opening is through both the body sheet metal and a molding member.

Having described my invention, I claim:

1. In a vehicle, a combination comprising:
   a hollow vehicle body structure having a bottom wall having a bottom opening;
   a plug formed of a resilient material and removably mounted in said bottom opening, said plug having an inner portion and an outer portion, said inner portion being supported above said outer portion, each of said portions having a diameter greater than that of said bottom opening, at least one of said portions being resiliently deformable to a diameter permitting passage thereof through said bottom opening, and said inner portion and said outer portion being disposed on opposite sides of said wall;
   said outer portion having an opening permitting the passage of water therethrough;
   said inner portion having a drain opening aligned with said bottom opening, and said inner portion having means forming a slot extending from said drain opening through the inner portion such that said bottom wall defines the bottom of the slot to permit water to pass in contact with said bottom wall to a position in which it is received in said bottom opening.

2. In a vehicle, a combination comprising:
   a hollow vehicle body structure including a sheet metal wall having an opening;
   a plug movably mounted in said opening, including a first plug wall on one side of said opening and a second plug wall on the opposite side of said opening, the first plug wall having resilient sections defining a slit formed such that the wall sections on opposite sides of the slit are relatively movable to open in response to air pressure acting on one side of said first plug wall; and
   the second plug wall having louvres for ventilating air and directing such air through the plug, both of said plug walls having a diameter greater than that of the opening in the sheet metal, at least one of said plug walls being resiliently deformable to a diameter permitting passage thereof through said sheet metal opening for permitting removal of the plug from said opening.

3. In a vehicle, a combination comprising:
   a pair of closely spaced sheet metal elements defining a hollow vehicle panel having a bottom, sheet metal end walls connecting opposite ends of said sheet metal elements, said end walls including a first end wall and a second end wall, spaced with respect to said first end wall, said first end wall having a first opening, the second end wall having a second opening, each of said openings being spaced above the bottom of said hollow panel;
   a first plug formed of a resilient material and removably mounted in said first opening, including a first plug wall on one side of said opening and a second plug wall on the other side of said opening, each of said plug walls being formed of a resilient material, the first plug wall having resilient sections defining a slit formed such that the wall sections on opposite sides of the slit are relatively movable to open in response to air pressure acting on one side of said first plug wall; and
   a second plug formed of a resilient material and removably mounted in said second opening, the second plug having louvres for receiving air and directing such air through the plug, both of said plugs having diameters greater than that of their respective openings in the sheet metal, said plugs being resiliently deformable to a diameter permitting passage thereof through said sheet metal openings permitting removal of the plugs from said openings.

* * * * *